(12) United States Patent
Sato et al.

(10) Patent No.: US 12,269,708 B2
(45) Date of Patent: Apr. 8, 2025

(54) HOUSING UNIT AND WOUND BODY

(71) Applicant: Fujikura Ltd., Tokyo (JP)

(72) Inventors: Takafumi Sato, Sakura (JP); Masayuki Ishioka, Sakura (JP); Ryo Inagaki, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 98 days.

(21) Appl. No.: 18/036,601

(22) PCT Filed: Sep. 7, 2021

(86) PCT No.: PCT/JP2021/032855
§ 371 (c)(1),
(2) Date: May 11, 2023

(87) PCT Pub. No.: WO2022/137660
PCT Pub. Date: Jun. 30, 2022

(65) Prior Publication Data
US 2023/0365378 A1 Nov. 16, 2023

(30) Foreign Application Priority Data
Dec. 24, 2020 (JP) .................... 2020-215489

(51) Int. Cl.
*B65H 75/36* (2006.01)
(52) U.S. Cl.
CPC ................. *B65H 75/362* (2013.01)
(58) Field of Classification Search
CPC .... B65H 75/362; B65H 75/364; B65H 75/36; B65H 75/34; B65H 75/02; B65H 75/00; B65H 54/00; B65H 54/02; B65H 54/026
See application file for complete search history.

(56) References Cited

U.S. PATENT DOCUMENTS 2,634,922 A * 4/1953 Taylor, Jr. ............ B65H 55/046
242/174
2,895,210 A 7/1959 Hubbard
3,285,721 A 11/1966 Ewing
(Continued)

FOREIGN PATENT DOCUMENTS

CN  109019144 A   12/2018
CN  109896350 A * 6/2019
(Continued)

OTHER PUBLICATIONS

International Search Report issued in corresponding International Application No. PCT/JP2021/032855 mailed Oct. 26, 2021 (5 pages).
(Continued)

*Primary Examiner* — Javier A Pagan
(74) *Attorney, Agent, or Firm* — Osha Bergman Watanabe & Burton LLP

(57) ABSTRACT

A housing unit includes: a linear material; and a housing body that houses the linear material. In the housing body, winding regions in which the linear material is wound are disposed in a circumferential direction. The linear material is wound in a figure eight in a first region pair constituted by a pair of the winding regions. The linear material is wound in a figure eight in a second region pair constituted by a pair of the winding regions that are different from the winding regions constituting the first region pair.

14 Claims, 9 Drawing Sheets

(56) References Cited

U.S. PATENT DOCUMENTS

| | | | | |
|---|---|---|---|---|
| 9,731,931 B2 * | 8/2017 | Kotzur | ................ | B65H 59/387 |
| 10,273,113 B2 | 4/2019 | Kotzur et al. | | |

FOREIGN PATENT DOCUMENTS

| | | | |
|---|---|---|---|
| DE | 3013296 A1 | | 10/1980 |
| DE | 3115371 A1 | | 2/1982 |
| DE | 3901063 A1 | | 7/1990 |
| JP | 1978073491 U | | 6/1978 |
| JP | S63160984 A | | 7/1988 |
| JP | H01209284 A | | 8/1989 |
| JP | H05196822 A | * | 8/1993 |
| JP | H078705 B2 | | 2/1995 |
| JP | 2561736 B2 | | 12/1996 |
| JP | 2013184795 A | * | 9/2013 |

OTHER PUBLICATIONS

Written Opinion issued in corresponding International Application No. PCT/JP2021/032855 mailed Oct. 26, 2021 (3 pages).

* cited by examiner

|  | S-DIRECTION | Z-DIRECTION |
|---|---|---|
| REGION PAIR XY |  |  |
| REGION PAIR YX |  |  |

(REGION PAIR AC : S-DIRECTION)

(REGION PAIR CE : Z-DIRECTION)

(REGION PAIR EG : S-DIRECTION)

(REGION PAIR GB : Z-DIRECTION)

(REGION PAIR BD : S-DIRECTION)

(REGION PAIR DF : Z-DIRECTION)

(REGION PAIR CA : S-DIRECTION)

(REGION PAIR EC : Z-DIRECTION)

(REGION PAIR GE : S-DIRECTION)

(REGION PAIR BG : Z-DIRECTION)

(REGION PAIR DB : S-DIRECTION)

(REGION PAIR FD : Z-DIRECTION)

(REGION PAIR AC : S-DIRECTION)

(REGION PAIR EC : S-DIRECTION)

(REGION PAIR EG : S-DIRECTION)

(REGION PAIR BG : S-DIRECTION)

(REGION PAIR BD : S-DIRECTION)

(REGION PAIR FD : S-DIRECTION)

HOUSING UNIT AND WOUND BODY

TECHNICAL FIELD

The present invention relates to a housing unit and a wound body.

The present application claims priority based on Japanese Patent Application No. 2020-215489 filed on Dec. 24, 2020, the entire contents of which are incorporated herein by reference.

BACKGROUND

Examples of techniques for packing a linear material such as a cable or a wire include the techniques described in Patent Literatures 1 to 5. Patent Literatures 1 to 5 describe that a cable is wound in a figure eight for storage. Note that, by storing a cable in a figure eight configuration, it is possible to suppress the cable from being twisted when the cable is linearly pulled out without rotating a packing body.

PATENT LITERATURE

Patent Literature 1: U.S. Pat. No. 10,273,113
Patent Literature 2: JP H01-209284A
Patent Literature 3: JP HOS-196822A
Patent Literature 4: JP Patent No. 2561736
Patent Literature 5: JP H07-008705B When a linear material wound in a figure eight is simply stacked, intersection points of the linear material wound in a figure eight overlap at the same position, which consequently impairs storage volumetric efficiency. Even if the intersection points of the linear material wound in a figure eight are displaced from each other for housing, storage volumetric efficiency may still be reduced in some cases.

SUMMARY

The present invention provides a novel method for winding a linear material.

A housing unit according to one or more embodiments of the present invention includes: a linear material; and a housing body configured to house the linear material, wherein: in the housing body, a plurality of winding regions in which the linear material is wound are located in a circumferential direction; the linear material is wound in a figure eight in a first region pair constituted by a pair of the winding regions; and the linear material is wound in a figure eight in a second region pair constituted by a pair of the winding regions that are a combination of the winding regions differing from the winding regions constituting the first region pair.

A wound body according to one or more embodiments of the present invention is formed by winding a linear material, the wound body including a plurality of circular arc parts in which the linear material is wound in a circular arc shape, wherein: the plurality of circular arc parts are located in a circumferential direction; a pair of the circular arc parts constitutes a first circular arc pair in which the linear material is wound in a figure eight; and a pair of the circular arc parts that are a combination of the circular arc parts differing from the circular arc parts constituting the first circular arc pair constitutes a second circular arc pair in which the linear material is wound in a figure eight.

Other features of the present invention are made clear by the following description and the drawings.

According to the present invention, it is possible to house a linear material with high volumetric efficiency, and also suppress the linear material from being twisted when the linear material is pulled out.

DETAILED DESCRIPTION

Figure 1A:
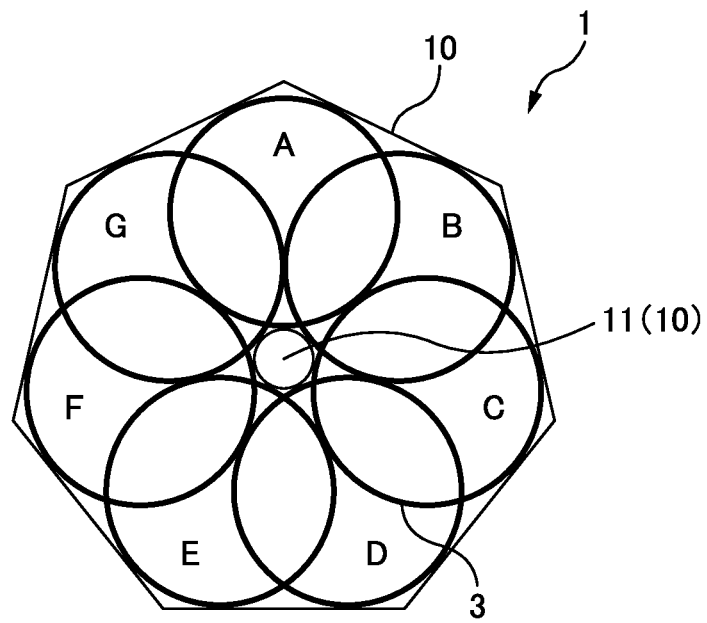
FIG. 1A is an explanatory diagram of a housing unit according to first embodiments.

At least the following matters are made clear from the following description and the drawings.

Disclosed is a housing unit including: a linear material; and a housing body configured to house the linear material, wherein in the housing body, a plurality of winding regions in which the linear material is wound are located in a circumferential direction, the linear material is wound in a figure eight in a first region pair constituted by a pair of the winding regions, and the linear material is wound in a figure eight in a second region pair constituted by a pair of the winding regions that are a combination of the winding regions differing from the winding regions constituting the first region pair. With this housing unit, it is possible to house a linear material with high volumetric efficiency, and also suppress the linear material from being twisted when the linear material is pulled out.

The housing body may be in contact with the linear material to maintain the posture of the linear material wound in the winding regions. In this way, it is possible to stably house the linear material which tries to loosen and expand due to bending rigidity.

The housing body may include a rod-shaped shaft member, the plurality of winding regions may be located around an outer circumference of the shaft member, and the shaft member may be in contact with the linear material wound in the plurality of winding regions. In this way, the posture of the linear material wound in each of the plurality of winding regions can be stabilized by a single shaft member.

An inner wall surface of the housing body may be formed in a polygonal cylindrical shape, and the linear material wound in the winding region may be in contact with the shaft member and two portions of the inner wall surface of the housing body. In this way, since the linear material wound in a circular arc shape (circularly) in the winding regions is held at three portions, the posture of the linear material wound in a circular arc shape in the winding regions can be stabilized.

An external shape of the housing body may be formed in a circular cylindrical shape. In this way, the housing unit can be rolled for transport.

The housing body may include a plurality of rod-shaped retaining members, the plurality of retaining members may be located in a circumferential direction along the inner wall surface of the housing body, and the linear material wound in the winding region may be in contact with the shaft member and two of the retaining members. In this way, since the linear material wound in a circular arc shape in the winding regions is held at three portions, the posture of the linear material wound in the circular arc shape can be stabilized.

The following relationship may hold, $$r < \frac{R}{1 + \frac{1}{\sin\left(\frac{360°}{N}\right)}}$$

where R is a radius of the housing body, r is a bend radius of the linear material wound in the winding regions, and N is the number of winding regions. In this way, N winding regions can be located in the housing body in a circular cylindrical shape.

Both the region pair in which the linear material is wound in a figure eight in an S-direction and the region pair in which the linear material is wound in a figure eight in a Z-direction may be included. In this way, twisting of the linear material can be suppressed from being accumulated.

The linear material may be wound in a figure eight in the region pairs while shifting the region pair in a predetermined direction in the circumferential direction, and the linear material may be wound in a figure eight in the region pairs while shifting the region pair in a direction opposite to the predetermined direction. In this way, the linear material can be suppressed from being twisted.

The linear material may be an optical cable. In this way, the optical cable can be suppressed from being twisted.

Also disclosed is a wound body formed by winding a linear material, the wound body including a plurality of circular arc parts in which the linear material is wound in a circular arc shape, wherein the plurality of circular arc parts are located in a circumferential direction, a pair of the circular arc parts constitutes a first circular arc pair in which the linear material is wound in a figure eight, and a pair of the circular arc parts that are a combination of the circular arc parts differing from the circular arc parts constituting the first circular arc pair constitutes a second circular arc pair in which the linear material is wound in a FIG. eight. With this wound body, it is possible to house the linear material with high volumetric efficiency, and also possible to pull the linear material out while suppressing the linear material from being twisted.

Also disclosed is a manufacturing method for manufacturing a housing unit in which a linear material is housed in a housing body, the housing body being configured such that a plurality of winding regions in which the linear material is wound are located in a circumferential direction, the manufacturing method including: winding the linear material in a figure eight in a first region pair constituted by a pair of the winding regions; and winding the linear material in a figure eight in a second region pair constituted by a pair of the winding regions that are a combination of winding regions differing from the winding regions constituting the first region pair. With this manufacturing method, it is possible to house the linear material with high volumetric efficiency, and also suppress the linear material from being twisted when the linear material is pulled out.

First Embodiments

Figure 1B:
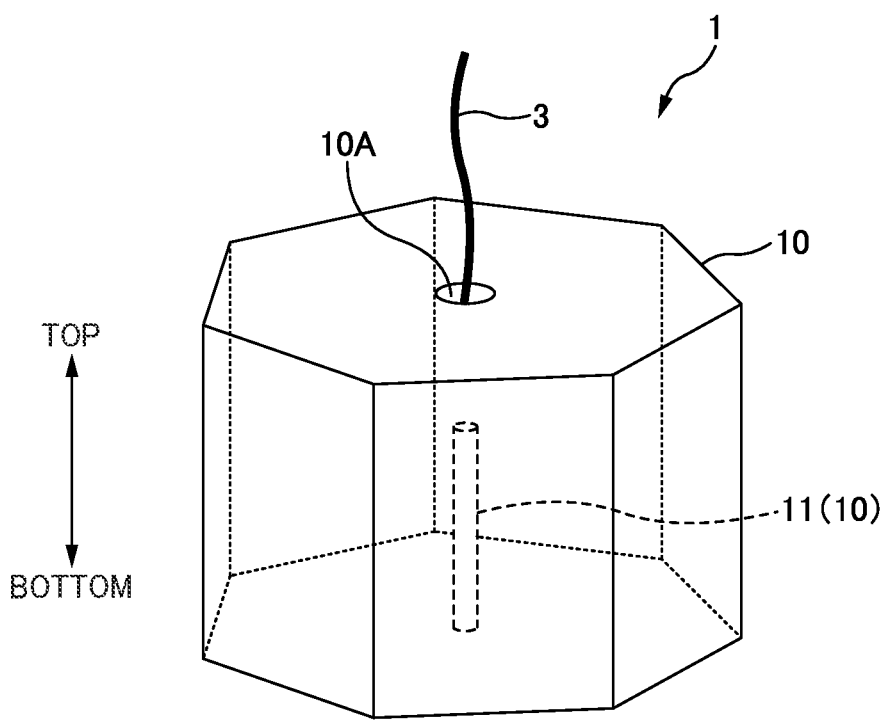
FIG. 1B is an explanatory diagram of a state of pulling out a linear material from the housing unit.

FIG. 1A is an explanatory diagram of a housing unit 1 according to first embodiments. FIG. 1B is an explanatory diagram of a state of pulling out a linear material 3 from the housing unit 1. In the following, as illustrated in FIG. 1B, description will be given by regarding the side where the linear material 3 is pulled out from a housing body 10 as "top" while regarding the opposite side as "bottom", in some cases. Note that FIG. 1A does not illustrate a top-bottom relationship of the linear material 3 at each of the intersection points. However, the top-bottom relationship of the linear material 3 at each of the intersection points will be apparent from winding methods to be described below.

The housing unit 1 is a member configured to house the linear material 3. The housing unit 1 includes a housing body 10 and the linear material 3.

The linear material 3 is a linear member. Examples of the linear material 3 include linear members such as cables (electric wire cables, optical cables, or the like) or wires. Here, description will be given by assuming that the linear material 3 is an optical cable.

The linear material 3 is housed in a wound state. The linear material 3 being wound is housed in a state of being stacked in a direction perpendicular to the sheet in which FIG. 1A is illustrated. As will be described below, the linear material 3 is housed in a state being wound in a predetermined direction (for example, the clockwise direction) and also being wound in the direction (for example, the counterclockwise direction) opposite to the predetermined direction. In the following description, the clockwise direction may be referred to a "forward direction", and the counterclockwise direction may be referred to as a "backward direction" (however, it is also possible to define the counterclockwise direction as a "forward direction" and the clockwise direction as a "backward direction").

Note that the linear material 3 in a wound state may be referred to as a "wound body". Hence, the housing unit 1 includes the wound body and the housing body 10. The winding-start-side end part of the linear material 3 may be referred to as a "base end", and the other-side end part may be referred to as a "leading end". As illustrated in FIG. 1B, when the linear material 3 is pulled out from the housing unit 1 (housing body 10), the linear material 3 is pulled out from the leading end, with the base end being pulled out last.

The housing body 10 is a member configured to house the linear material 3. The housing body 10 is a housing case formed of face material (plate material) or the like in a case shape (container shape) as illustrated in FIG. 1B, for example. Note that the housing body 10 is not limited to a housing case, and the housing body 10 may have any structure capable of housing the linear material 3 and may, for example, have a framework structure obtained by combining a multitude of frames.

The housing body 10 illustrated in FIG. 1B is configured to be rotational symmetric in cross section. Hence, a space (housing space) surrounded by an inner wall surface of the housing body 10 is configured to be rotational symmetric.

The external diameter of the housing body 10 is also configured to be rotational symmetric. Here, the housing body 10 is configured to have a regular heptagonal cylindrical shape (seven-fold symmetrical cylindrical shape). Note that the corners of the inner wall surface (internal corners) and the corners of the external shape (external corners) of the housing body 10 may be rounded instead of being angular. The housing body 10 includes an outlet 10A. The outlet 10A is an opening provided in the housing body 10. As illustrated in FIG. 1B, the linear material 3 can be pulled out from the outlet 10A. In one or more embodiments, the linear material 3 is housed in the housing body 10 such that, when the linear material 3 is pulled out from the outlet 10A, the pulled-out linear material 3 is suppressed from being twisted.

In the housing unit 1 illustrated in FIG. 1A, a plurality of winding regions (here, seven winding regions including a winding region A to a winding region G) are located in a circumferential direction. The winding regions are regions in which the linear material 3 (here, an optical cable) is wound. The linear material 3 is wound in each of the winding regions in a state of being stacked in a direction perpendicular to the sheet in which FIG. 1A is illustrated. The number of winding regions included in the housing unit 1 is seven in this example. However, the number of winding regions is not intended to be limited to seven, so long as it is three or more. In the following description, the winding regions may be specified by using alphabets. Here, alphabets are sequentially assigned to the respective winding regions along the circumferential direction by using the winding region at the 12 o'clock position in FIG. 1A as a reference.

The linear material 3 is wound in each of the winding regions a plurality of times. The linear material 3 is wound in each of the winding regions in the forward direction or the backward direction. In a certain winding region, the linear material 3 may be wound in the same direction (forward direction or backward direction) all the time or in both the forward direction and the backward direction.

The linear material 3 wound in a circular arc shape (circularly or in an arc shape) in a certain winding region (i.e., a portion of the linear material 3) may be referred to as a "circular arc part". The circular arc part is a part (curved part) of the linear material 3 curved in a circular arc shape. The circular arc part is not limited to have a configuration of the linear material 3 being wound in a circular arc shape (circular shape) of 360 degrees. The circular arc part may have a configuration wherein the linear material 3 is wound in a circular arc shape with an angle of less than 360 degrees, or may have a configuration wherein the linear material 3 is wound in a circular arc shape having an angle of greater than 360 degrees. When the circular arc part is configured by curving the linear material 3 in such a manner as to be closer to a perfect circle, the load on the linear material 3 can be more reduced, and the linear material 3 can be pulled out more smoothly. However, the circular arc part may have a configuration wherein the linear material 3 is wound in a circular arc shape that is distorted as an ellipse. The wound body (structure configured by winding the linear material 3) includes a plurality of circular arc parts located in the circumferential direction. In a certain winding region, a plurality of circular arc parts are located in such a manner as to be stacked in a direction perpendicular to the sheet in which FIG. 1A is illustrated. The wound body includes a multitude of circular arc parts in which the linear material 3 is wound in the forward direction and a multitude of circular arc parts in which the linear material 3 is wound in the backward direction.

Figure 2:
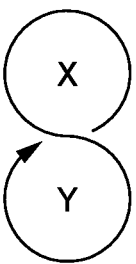
FIG. 2 is an explanatory diagram of how to wind the linear material in a pair of the winding regions.
Figure 2:
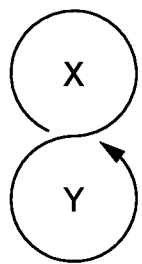
Figure 2:
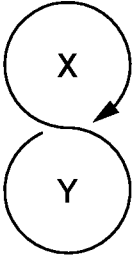
Figure 2:
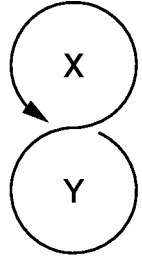

FIG. 2 is an explanatory diagram of how to wind the linear material 3 in a pair of the winding regions.

As illustrated in FIG. 2, the linear material 3 is wound in a figure eight in a pair of the winding regions (here, a winding region X and a winding region Y). More specifically, the linear material 3 is wound in the forward direction (or backward direction) in one of the two winding regions forming the pair and is also wound in the backward direction (or forward direction) in the other winding region. Note that the linear material 3 wound in a figure eight in the pair of the winding regions (here, the winding region X and the winding region Y) is constituted by two circular arc parts. The linear material 3 wound in a figure eight is not limited to the configuration including the two circular arc parts in which the linear material 3 is wound in a circular shape having an angle of 360 degrees, but as already described above, the linear material 3 may include circular arc parts in which the linear material 3 is wound in a circular arc shape having an angle of less than 360 degrees.

In the following description, the pair of the winding regions for the linear material 3 to be wound in a figure eight is referred to as a "region pair". When the pair of the winding regions constituting the region pair is constituted by the "winding region X" and the "winding region Y", the region pair is referred to as a "region pair XY" or a "region pair YX", or simply as "XY" or "YX". Note that, when the first winding region of the region pair in which the linear material 3 is wound in a figure eight is the "winding region X" and the second winding region is the "winding region Y", the region pair is referred to as the "region pair XY" or simply as "XY". When the first winding region of the region pair in which the linear material 3 is wound in a figure eight is the "winding region Y" and the second winding region is the "winding region X", the region pair is referred to as the "region pair YX" or simply as "YX".

In the following description, as illustrated in FIG. 2, winding of the linear material 3 in the backward direction (counterclockwise direction) in the first winding region of the region pair and then in the forward direction (clockwise direction) in the second winding region, to wind the linear material 3 in a figure eight, may be referred to as an "S-direction". In contrast, winding the linear material 3 in the forward direction in the first winding region of the region pair and then in the backward direction in the second winding region, to wind the linear material 3 in a figure eight, may be referred to as a "Z-direction". Note that, in this example, the starting point of the winding in the region pair and the end point of the winding in the region pair are located at the intersection point of the pair of the winding regions constituting the region pair (intersection point of the pair of the winding regions).

The linear material 3 wound in a figure eight is constituted by a circular arc part in which the linear material 3 is wound in the forward direction and a circular arc part in which the linear material 3 is wound in the backward direction. Hence, in the following description, the linear material 3 wound in a figure eight in the two circular arc parts (a portion of the linear material 3 constituting the two circular arc parts) may be referred to as a "circular arc pair". The circular arc pair constituted by the circular arc part located in the "winding region X" and the circular arc part located in the "winding region Y" may be referred to as a "circular arc pair XY" or a "circular arc pair YX", or simply as "XY" or "YX". When the base-end-side circular arc part of the pair of circular arc parts constituting the circular arc pair is located in the "winding region X" and the leading end-side circular arc part is located in the "winding region Y", the circular arc pair may be referred to as a "circular arc pair XY" or simply as "XY". The circular arc part in which the linear material 3 is wound in one of the forward direction and the backward direction may be referred to as a "first circular arc part", and the circular arc part in which the linear material 3 is wound in the other direction (direction opposite to that of the first circular arc part) may be referred to as a "second circular arc part". The circular arc pair is constituted by the first circular arc part and the second circular arc part.

Since the linear material 3 is wound in a figure eight in the region pair, twisting of the linear material 3 can be canceled out when the linear material 3 is pulled out from the region pair. The linear material 3 is repeatedly wound in a figure eight in a plurality of region pairs (to be described below), and hence twisting of the linear material 3 can be suppressed from being accumulated.

The N winding regions are located in the circumferential direction at intervals of 360°/N. For example, as illustrated in FIG. 1A, the winding region A and the winding region B are located in the circumferential direction at an interval of 360°/7. In contrast, a pair of the winding regions constituting each region pair (for example, the winding region A and the winding region C constituting a region pair AC) are located in the circumferential direction at an interval of 360°/(N/2). Hence, the intersection point of the linear material 3 wound in a figure eight (point of contact between a pair of the winding regions constituting the region pair; point of contact between the pair of circular arc parts constituting the circular arc pair) is located inside each winding region. In other words, the intersection point of the linear material 3 wound in a figure eight is located inside each circular arc part. In this way, it is possible to suppress the intersection point of the linear material 3 wound in a figure eight from overlapping the linear material 3 (circular arc parts) wound in the winding regions, and hence to house the linear material 3 with high volumetric efficiency (note that this similarly applies to second embodiments).

FIG. 3A to FIG. 3F are explanatory diagrams of a first winding method according to the first embodiments. Note that FIG. 3A to FIG. 3F are also an explanatory diagram of a method for manufacturing a housing unit 1 according to the first embodiments.

Figure 3A:
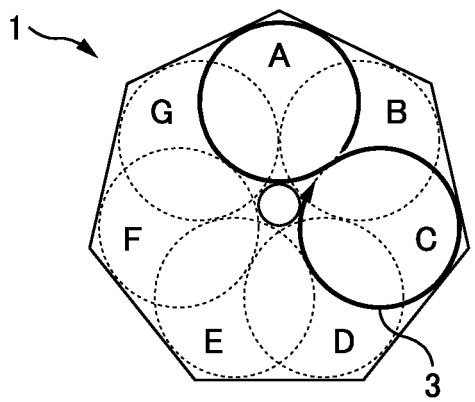
FIG. 3A to FIG. 3F are explanatory diagrams of a first winding method according to the first embodiments.

As illustrated in FIG. 3A, the linear material 3 is wound in a figure eight in the S-direction in the region pair AC. More specifically, the linear material 3 is wound in the backward direction (counterclockwise direction) in the winding region A, which is the first winding region of the region pair AC, and is then wound in the forward direction (clockwise direction) in the winding region C, which is the second winding region. In this way, the circular arc pair AC (corresponding to the first circular arc pair) is formed, which includes the circular arc part A in which the linear material 3 is wound in a circular arc shape in the winding region A and the circular arc part C in which the linear material 3 is wound in a circular arc shape in the winding region C.

Figure 3B:
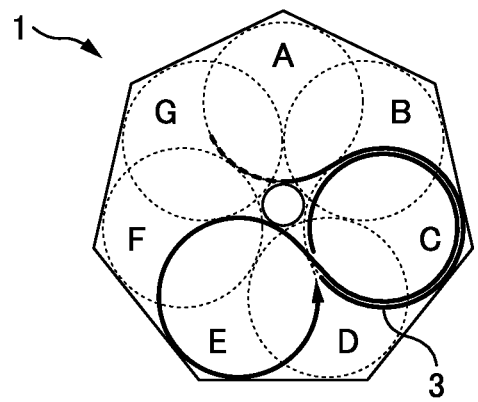

As illustrated in FIG. 3B, after the linear material 3 is wound in a figure eight in the S-direction in the region pair AC, the linear material 3 is subsequently wound in a figure eight in the Z-direction in a region pair CE. More specifically, the linear material 3 wound in a figure eight in the region pair AC (first region pair) is subsequently wound in a figure eight in the region pair CE (second region pair; different region pair including the winding region E different from the winding regions constituting the region pair AC) constituted by a pair of winding regions that are a combination of winding regions differing from the winding regions constituting the region pair AC. Here, the region pair in which the linear material 3 is wound in a figure eight is shifted from the region pair AC to the region pair CE in the clockwise direction in the circumferential direction. In this way, in succession to the circular arc pair AC, a circular arc pair CE (corresponding to the second circular arc pair) is formed, which includes the circular arc part C in which the linear material 3 is wound in a circular arc shape in the winding region C and a circular arc part E in which the linear material 3 is wound in a circular arc shape in the winding region E. The circular arc pair CE is constituted by the pair of circular arc parts (circular arc part C and circular arc part E) that are a combination of the circular arc parts differing from the circular arc parts constituting the base-end-side circular arc pair AC.

Figure 3C:
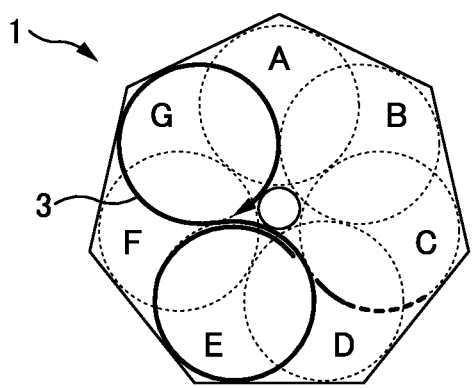
Figure 3D:
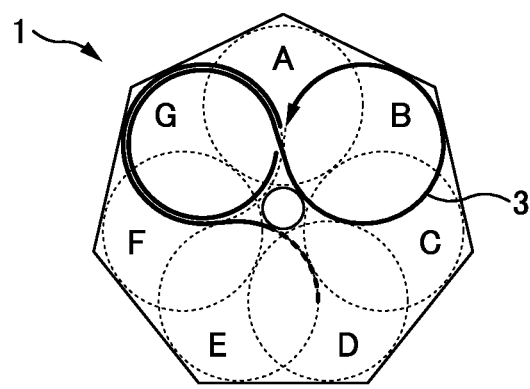
Figure 3E:
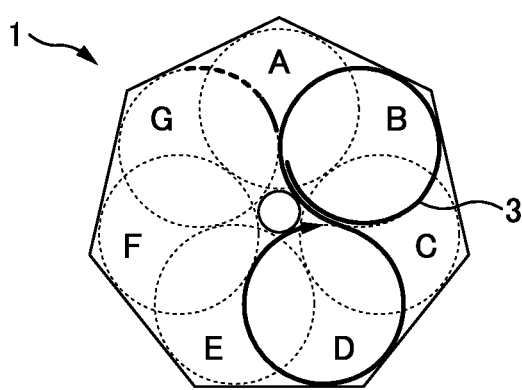
Figure 3F:
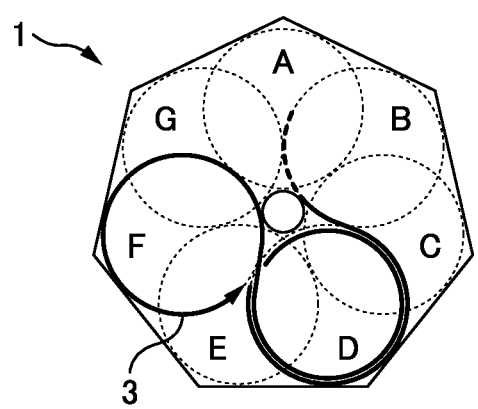

As illustrated in FIG. 3C, after the linear material 3 is wound in a figure eight in the Z-direction in the region pair CE, the linear material 3 is subsequently wound in a figure eight in the S-direction in a region pair EG. More specifically, the linear material 3 wound in a figure eight in the region pair CE is subsequently wound in a figure eight in the region pair EG (different region pair including the winding region G different from the winding regions constituting the region pair CE) constituted by a pair of winding regions that are a combination of winding regions differing from the winding regions constituting the region pair CE. Here, the region pair in which the linear material 3 is wound in a figure eight is shifted from the region pair CE to the region pair EG in the clockwise direction in the circumferential direction. In this way, in succession to the circular arc pair CE, a circular arc pair EG is formed, which includes the circular arc part E in which the linear material 3 is wound in a circular arc shape in the winding region E and a circular arc part G in which the linear material 3 is wound in a circular arc shape in the winding region G. The circular arc pair EG is constituted by the pair of circular arc parts (circular arc part E and circular arc part G) that are a combination of the circular arc parts differing from the circular arc parts constituting the base-end-side circular arc pair CE. After the linear material 3 is wound in a figure eight in the region pair EG, the linear material 3 is again wound in a figure eight in a certain region pair and then wound in a figure eight in a different region pair (the region pair in which the linear material 3 is wound in a figure eight is shifted to a different region pair) repeatedly as illustrated in FIG. 3D to FIG. 3F. In this way, the combination of the pair of circular arc parts constituting a base-end side circular arc pair becomes different from the combination of the pair of circular arc parts constituting a circular arc pair continuous to this base-end side circular arc pair on the leading end side.

As illustrated in FIG. 3A to FIG. 3F, the region pair in which the linear material 3 is wound in a figure eight is shifted in the order of AC→CE→EG→GB→BD→DF . . . . In other words, in the winding method illustrated in FIG. 3A to FIG. 3F, the region pair in which the linear material 3 is wound in a figure eight is shifted in the clockwise direction in the circumferential direction. Stated differently, as illustrated in FIG. 3A to FIG. 3F, the circular arc pairs are continuously formed in the clockwise direction in the circumferential direction in the order of AC→CE→EG→GB→BD→DF . . . . However, the direction in which the region pair is shifted is not limited to the clockwise direction, and it may be in the counterclockwise direction.

The linear material 3 is wound in a figure eight in a certain region pair (for example, the region pair AC; first region pair) and is also wound in a figure eight in a different region pair (region pair constituted by a pair of winding regions including a different winding region from the winding regions constituting the certain region pair; for example, the region pair CE; second region pair). In other words, the linear material 3 is wound in a figure eight in the first region pair (for example, the region pair AC) constituted by a pair of winding regions and is also wound in a figure eight in the second region pair (for example, the region pair CE) constituted by a pair of winding regions that are a combination of winding regions differing from the winding regions constituting the first region pair. Stated differently, the wound body includes a plurality of circular arc parts located in the circumferential direction, and includes the first circular arc pair (for example, the circular arc pair AC) constituted by a pair of circular arc parts in which the linear material 3 is wound in a figure eight and the second circular arc pair (for example, the circular arc pair CE) in which the linear material 3 is wound in a figure eight, the second circular arc pair being constituted by a pair of circular arc parts that are a combination of the circular arc parts differing from the circular arc parts constituting the first circular arc pair. In this way, by the linear material 3 being wound in a figure eight in different region pairs, the linear material 3 can be housed with the intersection points of the linear material 3 being shifted. In addition, the plurality of winding regions are located in the circumferential direction, and the region pair in which the linear material 3 is wound in a figure eight is shifted in the circumferential direction. This enables the linear material 3 to be housed with high volumetric efficiency (note that this similarly applies to the second embodiments) compared to a case supposing that the linear material 3 is housed with the intersection points of the linear material 3 wound in a figure eight being displaced in a linear direction (for example, a direction perpendicular to a line linking the centers of two winding regions).

As illustrated in FIG. 3A to FIG. 3F, there is a common winding region between the region pairs before and after shifting (in other words, each two continuous circular pairs has a common circular arc part). For example, as illustrated in FIG. 3A and FIG. 3B, when the region pair in which the linear material 3 is wound in a figure eight is shifted from the region pair AC to the region pair CE, the linear material 3 is wound in the winding region C which exists in common in both of the winding region pairs (in other words, the two continuous circular arc pairs AC and CE have the circular arc part C in common). In this way, by shifting the region pair to include a common winding region, the linear material 3 is wound in an overlapping manner in the winding region common to the region pairs before and after shifting, and hence the linear material 3 can be housed stably. However, as in the order of AC→EG→BD→FA→ . . . , it is also possible to wind the linear material 3 without the presence of a winding region common to the region pairs before and after shifting (note that this similarly applies to the second embodiments).

Note that, in the first winding method illustrated in FIG. 3A to FIG. 3F, the second winding region of the region pair before shifting of a region pair (for example, the winding region C of the region pair AC in FIG. 3A) and the first winding region of the region pair after the shifting of the region pair (for example, the winding region C of the region pair CE in FIG. 3B) are in common. In other words, the leading end-side circular arc part of the circular arc pair AC and the base-end-side circular arc part of the circular arc pair CE are located in the common winding region C. However, the winding region common to the region pairs before and after shifting is not intended to be limited to this (to be described below; refer to a second winding method). Alternatively, region pairs before and after shifting may include no common winding region.

Figure 4A:
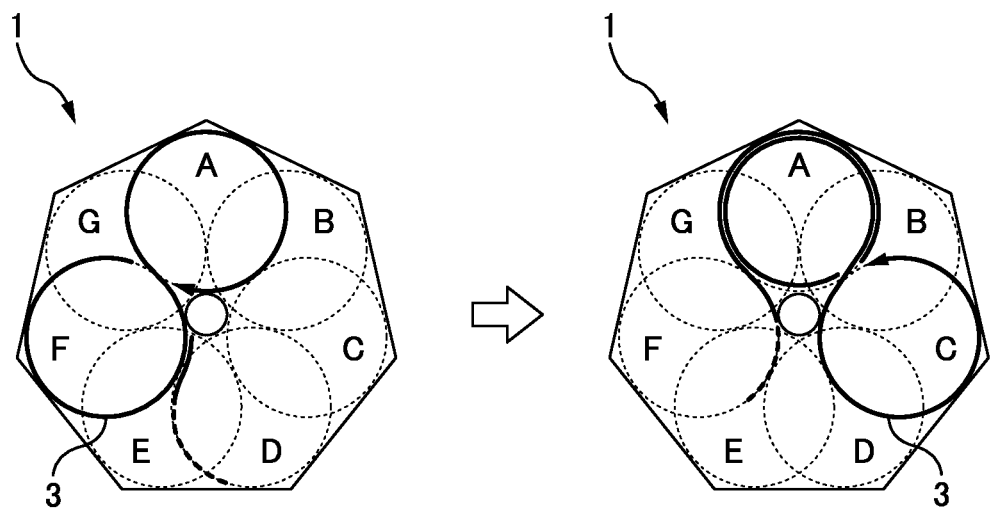
FIG. 4A is an explanatory diagram of a case where the direction in which the region pair is shifted is continued.

FIG. 4A is an explanatory diagram of a case where the direction in which a region pair is shifted is continued. After the linear material 3 is wound in a figure eight in the region pair DF as illustrated in FIG. 3F, it is possible to continuously shift the region pair in the clockwise direction in the circumferential direction as illustrated in FIG. 3A to FIG. 3F in such a manner that the region pair in which the linear material 3 is wound in a figure eight is shifted in the order of DF→FA→AC→ . . . as illustrated in FIG. 4A.

At the time of shifting a region pair in which the linear material 3 is wound, the linear material 3 needs to be wound between the end point of winding in the region pair before the shifting and the starting point of the winding in the region pair after the shifting. In the following description, a section from the end point of winding in the region pair before the shifting to the starting point of the winding in the region pair after the shifting may be referred to as an "adjustment section".

The adjustment section when the region pair, in which the linear material 3 is wound in a figure eight, is shifted from the region pair AC to the region pair CE is the section illustrated with a double bold line in FIG. 3B, and the linear material 3 is wound in the forward direction (clockwise direction) in this adjustment section. In contrast, the adjustment section when the region pair, in which the linear material 3 is wound in a figure eight, is shifted from the region pair CE to the region pair EG is the section illustrated with a double bold line in FIG. 3C, and the linear material 3 is wound in the backward direction (counterclockwise direction) in this adjustment section. In this way, by making the direction of winding the linear material 3 in a certain adjustment section be in the opposite direction from the direction of winding the linear material 3 in a different adjustment section, twisting of the linear material 3 occurring in the adjustment sections can be canceled out.

Meanwhile, the adjustment section when the region pair, in which the linear material 3 is wound in a figure eight, is shifted from the region pair AC to the region pair CE is the circular arc section on the "outer side" of the winding region C (refer to the double bold line in FIG. 3B). In contrast, the adjustment section when the region pair, in which the linear material 3 is wound in a figure eight, is shifted from the region pair CE to the region pair EG is the circular arc section on the "inner side" of the winding region C (refer to the double bold line in FIG. 3C). In this way, the adjustment section when shifting proceeds from a region pair in which the linear material 3 is wound in the S-direction to a region pair in which the linear material 3 is wound in the Z-direction is a circular arc section on the "outer side" of a winding region (each of sections illustrated with double bold lines in FIG. 3B, FIG. 3D, and FIG. 3F), whereas the adjustment section when shifting proceeds from a region pair in which the linear material 3 is wound in the Z-direction to a region pair in which the linear material 3 is wound in the S-direction is a circular arc section on the "inner side" of a winding region (each of sections illustrated with double bold lines in FIG. 3C and FIG. 3E). The adjustment section on the "outer side" of a winding region (each of sections illustrated with double bold lines in FIG. 3B, FIG. 3D, and FIG. 3F) is longer than the adjustment section on the "inner side" of a winding region (each of sections illustrated with double bold lines in FIG. 3C and FIG. 3E). Hence, as illustrated in FIG. 3A to FIG. 3F and FIG. 4A, when the region pair is continuously shifted in the clockwise direction in the circumferential direction, twisting may be accumulated in the linear material 3 by an amount worth the difference in length between a forward-direction adjustment section and a backward-direction adjustment section.

Figure 4B:
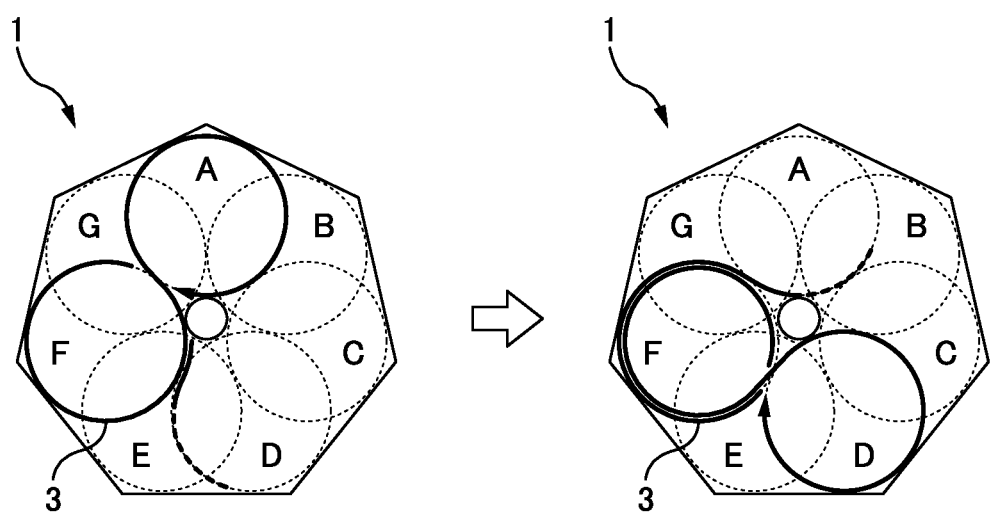
FIG. 4B is an explanatory diagram of a case where the direction in which the region pair is shifted is reversed.

FIG. 4B is an explanatory diagram of a case where the direction in which the region pair is shifted is reversed. After the linear material 3 is wound in a figure eight in the region pair DF as illustrated in FIG. 3F, the region pair in which the linear material 3 is wound in a figure eight is shifted in the order of DF→FA→AF→FD→ . . . as illustrated in FIG. 4B and is subsequently shifted in the opposite direction from that in FIG. 3A to FIG. 3F; more specifically, the region pair is shifted in the counterclockwise direction along the circumferential direction. More specifically, the region pair in which the linear material 3 is wound in a figure eight is first shifted in the clockwise direction as in the order of AC→CE→EG→GB→BD→DF→FA (refer to FIG. 3A to FIG. 3F and the left drawing in FIG. 4B) and is subsequently shifted in the counterclockwise direction as in the order of AF→FD→DB→BG→GE→EC→CA. In this case, by shifting the region pair in the counterclockwise direction along the circumferential direction, twisting of the linear material 3 accumulated while the region pair is shifted in the clockwise direction along the circumferential direction can be canceled out. In other words, the linear material 3 is wound in a figure eight in the region pair while shifting the region pair in the clockwise direction (predetermined direction), and also, the linear material 3 is wound in a figure eight in the region pair while shifting the region pair in the counterclockwise direction (direction opposite to the predetermined direction), to thereby be able to suppress the linear material 3 from being twisted. Hence, the directions in which the region pair is shifted in the circumferential direction may be changed, alternately and repeatedly, between the clockwise direction and the counterclockwise direction. In other words, the directions in which the region pair is shifted in the circumferential direction may be reversed during winding. However, when accumulation of twist of the linear material 3 can be tolerated, the direction in which the region pair is shifted in the circumferential direction does not have to be reversed.

Note that, by repeatedly shifting the region pair—in which the linear material 3 is wound in a figure eight—to a different region pair, the entire linear material 3 is wound. In other words, the wound body is configured by the linear material 3 being wound according to the above-described winding method. However, it is not necessary that the entire linear material 3 be wound according to this winding method, so long as a portion of the linear material 3 is wound according to the above-described method. More specifically, it is not necessary that all of a plurality of layers constituting the wound body be configured by the linear material 3 wound according to the above-described winding method, so long as a portion of the layers is configured by the linear material 3 wound according to the above-described method. By winding a portion of the linear material 3 according to the above-described winding method, it is possible to house the linear material 3 with high volumetric efficiency, and also suppress the linear material 3 from being twisted when the linear material 3 is pulled out (this similarly applies to winding methods according to other aspects/embodiments).

FIG. 5A to FIG. 5F are explanatory diagrams of a second winding method according to the first embodiments.

Figure 5A:
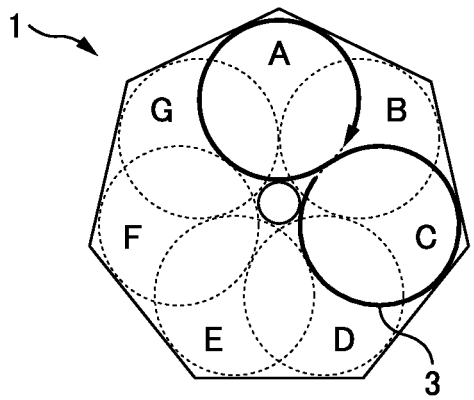
FIG. 5A to FIG. 5F are explanatory diagrams of a second winding method according to the first embodiments.
Figure 5B:
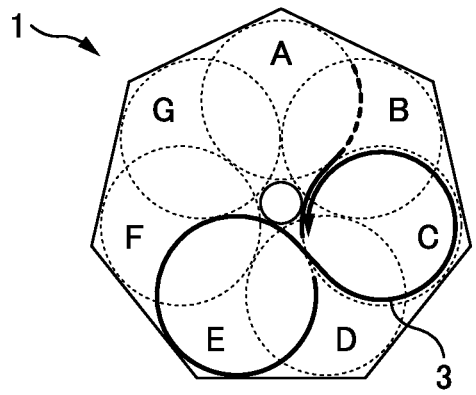
Figure 5C:
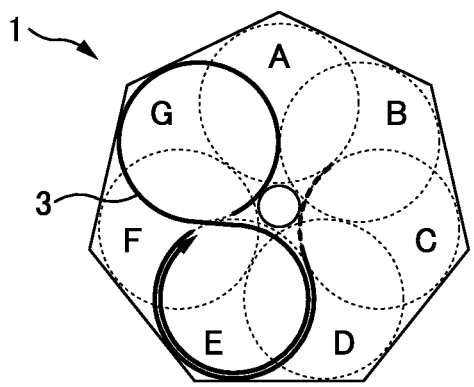
Figure 5D:
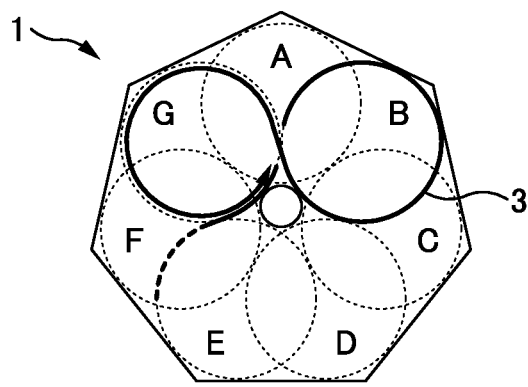
Figure 5E:
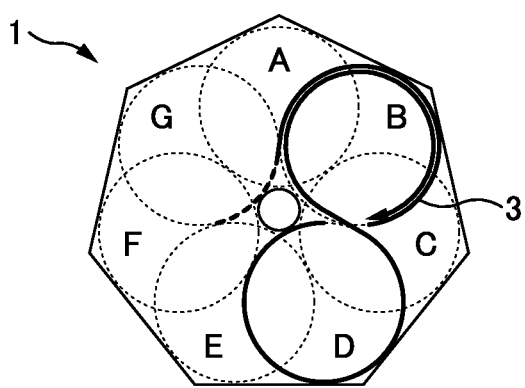
Figure 5F:
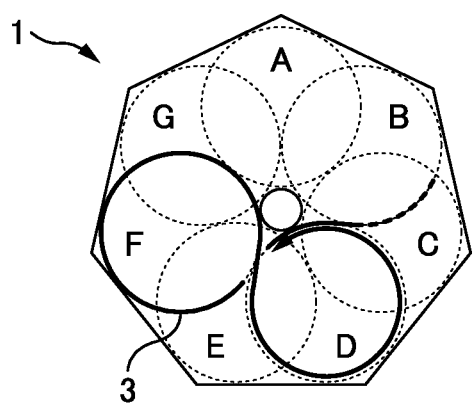
Figure 6A:
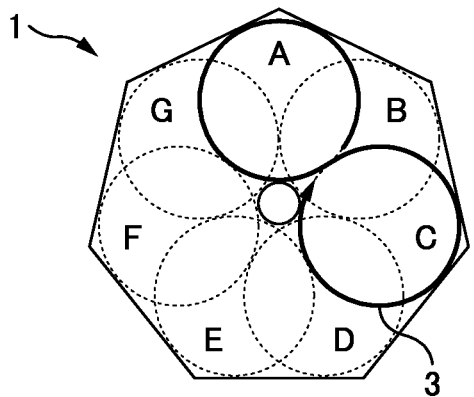
FIG. 6A to FIG. 6F are explanatory diagrams of a third winding method according to the first embodiments.
Figure 6B:
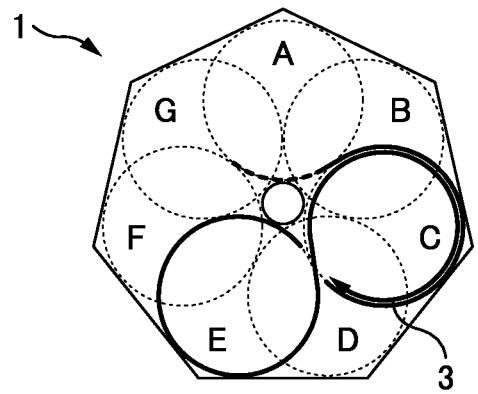
Figure 6C:
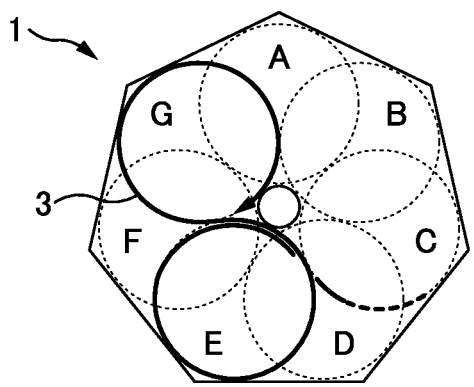
Figure 6D:
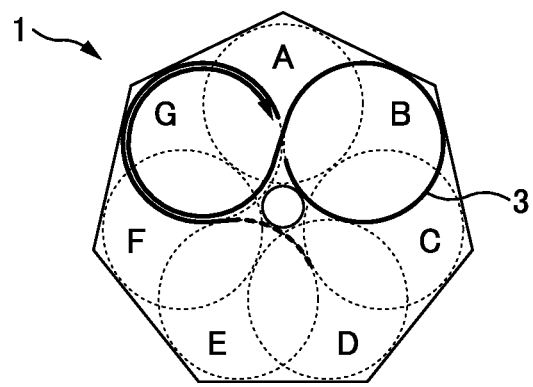
Figure 6E:
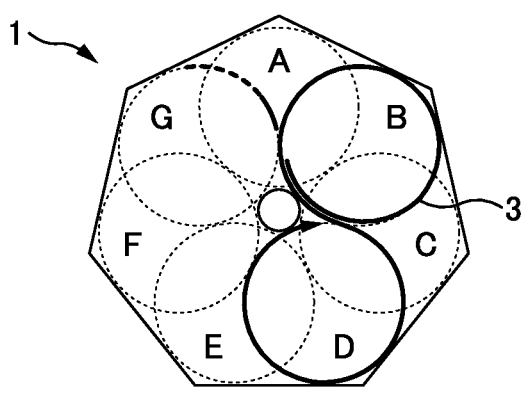
Figure 6F:
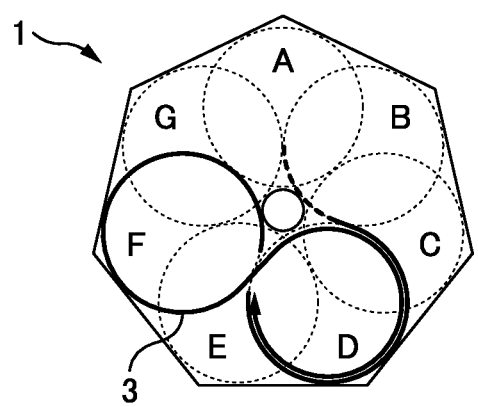

In the second winding method, the region pair in which the linear material 3 is wound in a figure eight is shifted in the order of CA→EC→GE→BG→DB→FD . . . . More specifically, in the second winding method, the circular arc pairs are continuously formed in the order of CA→EC→GE→BG→DB→FD . . . . Also in the second winding method, a common winding region is present before and after shifting of a region pair as in the first winding method. For example, as illustrated in FIG. 5A and FIG. 5B, when the region pair in which the linear material 3 is wound in a figure eight is shifted from the region pair CA to the region pair EC, the linear material 3 is wound in the winding region C commonly in both of the winding region pairs. In this way, also in the second winding method, the linear material 3 is wound in an overlapping manner in the winding region common to the region pairs before and after shifting, and hence the linear material 3 can be housed stably.

In contrast, in the second winding method, the first winding region of the region pair before shifting of a region pair (for example, the winding region C of the region pair CA in FIG. 5A) and the second winding region of the region pair after the shifting of the region pair (for example, the winding region C of the region pair EC in FIG. 5B) are in common. As described here, the method of using a common winding region before and after shifting a region pair is not limited to the first winding method, i.e., the method of using the second winding region before shifting and the first winding region after the shifting as a common winding region.

In the first winding method and the second winding method, the direction in which the linear material 3 is wound in a figure eight in a region pair is alternately shifted between the S-direction and the Z-direction every time a region pair is shifted (in other words, when circular arc pairs are continuously formed, the direction in which the linear material 3 is wound in the base-end-side circular arc part of each circular arc pair is shifted alternately). For example, in the first winding method, the direction in which the linear material 3 is wound in a figure eight in each region pair is shifted alternately in the order of the S-direction (AC)→Z-direction (CE)→S-direction (EG)→Z-direction (GB)→S-direction (BD)→Z-direction (DF)→ . . . as illustrated in FIG. 3A to FIG. 3F. In the second winding method, the direction in which the linear material 3 is wound in a figure eight in each region pair is shifted alternately in the order of the S-direction (CA)→Z-direction (EC)→S-direction (GE)→Z-direction (BG)→S-direction (DB)→Z-direction (FD)→ . . . as illustrated in FIG. 5A to FIG. 5F. In this way, by including both region pairs in which the linear material 3 is wound in a figure eight in the S-direction and region pairs in which the linear material 3 is wound in a figure eight in the Z-direction, it is possible to suppress twisting of the linear material 3 from being accumulated. However, when accumulation of twist of the linear material 3 can be tolerated, it is not necessary to include both region pairs in which the linear material 3 is wound in a figure eight in the S-direction and region pairs in which the linear material 3 is wound in a figure eight in the Z-direction. By alternately changing the direction in which the linear material 3 is wound in a figure eight every time a region pair is shifted, it is possible to further suppress twisting of the linear material 3 from being accumulated. However, the direction in which the linear material 3 is wound in a figure eight in a region pair is not limited to this (to be described next).

FIG. 6A to FIG. 6F are explanatory diagrams of a third winding method according to the first embodiments.

In the third winding method, the direction in which the linear material 3 is wound in a figure eight in each region pair is shifted in the order of the S-direction (AC)→S-direction (EC)→S-direction (EG)→S-direction (BG)→S- direction (BD)→S-direction (FD)→ . . . as illustrated in FIG. 6A to FIG. 6F, so that the linear material 3 is wound in a figure eight in the S-direction in all the region pairs. As described here, the direction in which the linear material 3 is wound in a figure eight in each region pair does not necessarily have to be shifted alternately between the S-direction and the Z-direction, and may be only in the S-direction or only in the Z-direction in all the region pairs, or may be shifted between the S-direction and the Z-direction but not shifted alternately (for example, after the linear material 3 is wound in a figure eight in the S-direction consecutively, the linear material 3 may be wound in a figure eight in the Z-direction consecutively).

Note that, also in the second winding method and the third winding method, twisting of the linear material 3 may possibly be accumulated in an adjustment section. Hence, also in the second winding method and the third winding method, the directions in which the region pair is shifted in the circumferential direction may be changed, alternately and repeatedly, between the clockwise direction and the counterclockwise direction. In other words, also in the second winding method and the third winding method, the directions in which the region pair is shifted in the circumferential direction may be reversed during winding.

In a case where the linear material 3 is an optical cable, when the linear material 3 is curved, the curved cable will try to return from the curved state to its original state due to the action of bending rigidity of the optical cable. Hence, in the case where the linear material 3 is an optical cable, the linear material 3 wound in a circular arc shape in the winding regions will try to loosen and expand. To address this, by bringing the housing body 10 and the linear material 3 (optical cable) into contact with each other, the posture (the state, shape, form, etc.) of the linear material 3 wound in the winding regions can be maintained. In this way, the linear material 3 (optical cable) trying to loosen and expand due to bending rigidity can be housed stably. Hence, causing the housing body 10 and the linear material 3 (optical cable) to be in contact with each other is particularly effective in the cases where the linear material 3 is an optical cable.

The housing body 10 illustrated in FIG. 1A includes a shaft member 11. The shaft member 11 is a rod-shaped member. The housing body 10 is configured to be rotational symmetric in cross section, and the shaft member 11 is located at the center of the housing body 10. The shaft member 11 is located at the center of the housing body 10 (refer to FIG. 1B), with its axial direction oriented in the direction perpendicular to the sheet in which FIG. 1A is illustrated. The linear material 3 wound in the winding regions (circular arc parts) is in contact with the shaft member 11. In this way, the posture of the linear material 3 is stabilized, and the linear material 3 can be housed stably. The shaft member 11 is exchangeable. By changing the diameter of the shaft member 11, it is possible to accommodate linear materials 3 of various thicknesses.

The plurality of winding regions are located around the outer circumference of the shaft member 11. The shaft member 11 is in contact with the linear material 3 wound in each of the plurality of winding regions (plurality of circular arc parts located in the circumferential direction). In this way, the single shaft member 11 can stabilize the posture of the linear material 3 (circular arc parts) wound in each of the plurality of winding regions.

Each of the circular arc parts (linear material 3 wound in the winding regions) may be in contact with the shaft member 11 and two portions of an inner wall surface of the housing body 10. In this way, each of the circular arc parts (linear material 3 wound in a circular arc shape in the winding regions) is held at three portions; hence, the posture of the circular arc part can be stabilized. Note that the number of portions at which each circular arc part is in contact with other members is not limited to three and may be three or more (to be described below).

The inner wall surface of the housing body 10 may be constituted by a plurality of planar side surfaces and may be formed in a polygonal cylindrical shape. In this way, each of the circular arc parts (linear material 3 wound in the winding regions) can be in contact with two portions of the inner wall surface of the housing body 10. However, as will be described below, the housing body 10 may be formed in a circular cylindrical shape.

Each of the circular arc parts (linear material 3 wound in the winding regions) may be held at three portions (more specifically, each circular arc part may be held at three portions including the shaft member 11 and two portions of the inner wall surface of the housing body 10). In this way, the linear material 3 wound in a circular arc shape is inhibited from loosening and expanding; hence, it is possible to retain the posture of the linear material 3, which attempts to unwind and loosen due to bending rigidity. As described above, retaining the linear material 3 wound in each of the winding regions at three portions (the shaft member 11 and two portions of the inner wall surface of the housing body 10) is particularly effective in the case where the linear material 3 is an optical cable. Note that, in cases where the linear material 3 is an optical cable, since the optical cable's allowable bend radius is defined in advance, the linear material 3 may be wound in the winding regions at a radius larger than the allowable bend radius.

Second Embodiments

Figure 7:
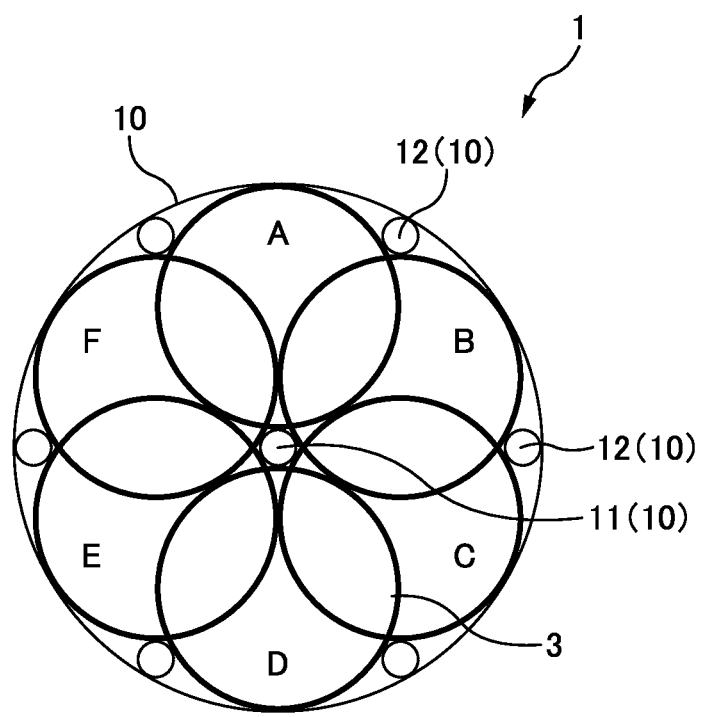
FIG. 7 is an explanatory diagram of a housing unit according to second embodiments.

FIG. 7 is an explanatory diagram of a housing unit 1 according to second embodiments. Also in the second embodiments, the housing unit 1 includes the housing body 10 and the linear material 3.

Also in the second embodiments, the housing body 10 includes the shaft member 11. Also in the second embodiments, each of the circular arc parts (linear material 3 wound in the winding regions) is in contact with the shaft member 11. In this way, the posture of the linear material 3 is stabilized, and the linear material 3 can be housed stably.

In the second embodiments, the external shape of the housing body 10 is formed in a circular cylindrical shape. In this way, the housing unit 1 can be rolled for transport. Note that, since the inner wall surface of the housing body 10 is formed in a circular cylindrical shape in the second embodiments, each of the circular arc parts cannot be in contact with two portions of the inner wall surface of the housing body 10, which is possible in the first embodiments, but is instead in contact with one portion of the inner wall surface of the housing body 10.

In the second embodiments, the housing body 10 includes a plurality of retaining members 12. The retaining member 12 is a member configured to contact the linear material 3 wound in the winding regions (circular arc parts). The retaining member 12 is a rod-shaped member and located near the inner wall surface of the housing body 10, with its axial direction oriented in the direction perpendicular to the sheet in which FIG. 7 is illustrated. In other words, the retaining member 12 is located in parallel with the shaft member 11. The plurality of retaining members 12 are located at approximately regular intervals in the circumferential direction of the inner wall surface. The retaining members 12 are each exchangeable, like the shaft member 11. By changing the diameter of the retaining members 12, it is possible to accommodate linear materials 3 of various thicknesses. Note that, even when the housing body 10 is formed in a polygonal cylindrical shape as in the first embodiments, the housing body 10 may include a plurality of retaining members 12. By providing the housing body 10 with the retaining members 12, the number of portions at which each of the circular arc parts (linear material 3 wound in the winding regions) is in contact increases. In this way, the posture of the linear material 3 can be stabilized, and hence the linear material 3 can be housed stably.

As illustrated in FIG. 7, each of the circular arc parts (linear material 3 wound in the winding regions) is in contact with the shaft member 11 and two of the retaining members 12. In this way, each of the circular arc parts (linear material 3 wound in a circular arc shape in the winding regions) is held at three portions; hence, the posture of the circular arc part can be stabilized.

In the second embodiments, each of the circular arc parts (linear material 3 wound in the winding regions) is in contact with the shaft member 11 and two of the retaining members 12 and is also in contact with the inner wall surface of the housing body 10. In other words, in the second embodiments, each of the circular arc parts (linear material 3 wound in the winding regions) is in contact with other members at four portions in total. As described here, the number of portions at which the circular arc part is in contact with other members is not limited to three. Note that the circular arc parts do not have to be in contact with the inner wall surface of the housing body 10. Even in this case, each of the circular arc parts will be held at three portions (shaft member 11 and two retaining members 12), so the posture of the wound circular arc part can be stabilized.

Figure 8:
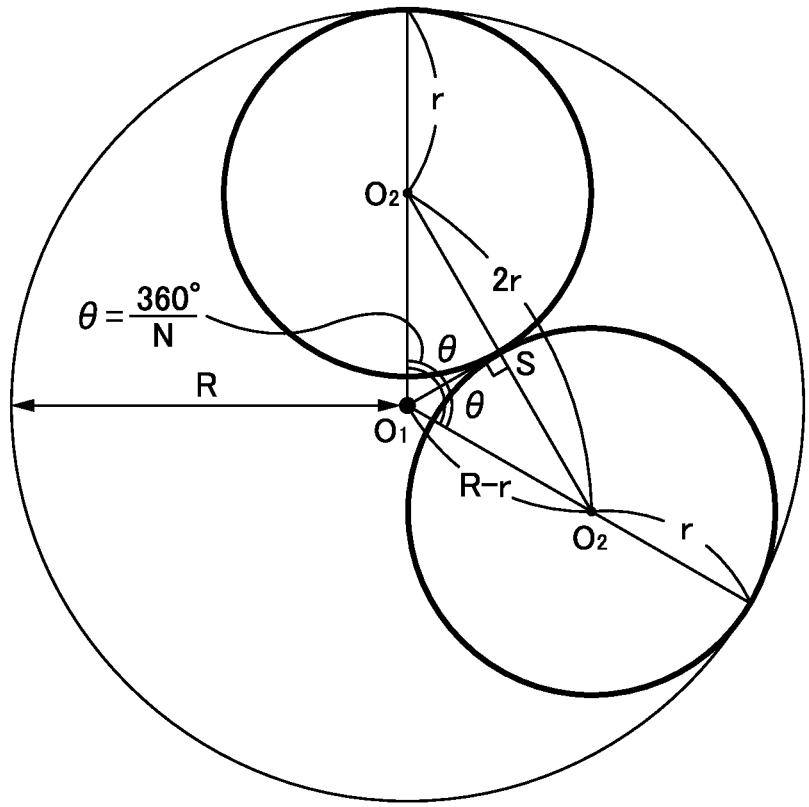
FIG. 8 is an explanatory diagram of a relationship between the radius of a housing body and the bend radius of the linear material.

FIG. 8 is an explanatory diagram of a relationship between the radius of the housing body 10 and the bend radius of the linear material 3. Here, the center of the housing body is denoted by O1, the bending center of the linear material 3 is denoted by O2, and the intersection point of the linear material 3 wound in a figure eight (point of contact of two circles) is denoted by S. The radius of the housing body 10 is denoted by R, and the bend radius of the linear material 3 is denoted by r.

Focusing on triangle O1-O2-S, ∠S is a right angle (triangle O1-O2-S is a right triangle). Sin θ=r/(R−r) holds where θ is ∠O1=θ in the triangle O1-O2-S. In a case where the number of winding regions is N, θ=360°/N holds, and hence the relationship between the radius R of the housing body 10 and the bend radius r of the linear material 3 is as indicated in the following equation.

$$r = \frac{R}{1 + \dfrac{1}{\sin\left(\dfrac{360°}{N}\right)}} \quad \text{[Math. 1]}$$

Note that since the linear material 3 has a thickness in reality, the relationship between the radius R of the housing body 10 and the bend radius r of the linear material 3 is as indicated in the following expression when the thickness of the linear material 3 is taken into account.

$$r < \frac{R}{1 + \dfrac{1}{\sin\left(\dfrac{360°}{N}\right)}} \quad \text{[Math. 2]}$$

When the radius R of the housing body 10 and the bend radius r of the linear material 3 have the relationship expressed in the above expression, N winding regions can be located in the housing body 10 in a circular cylindrical shape. The radius R of the housing body 10 and the bend radius r of the linear material 3 having the relationship expressed in the above expression is not only effective in the housing unit 1 of the second embodiments, but is also effective in the housing unit 1 of the first embodiments and other embodiments. Note that, in a case where the linear material 3 is an optical cable, the bend radius r of the linear material 3 may be larger than the allowable bend radius of the optical cable.

FIG. 9A to FIG. 9F are explanatory diagrams of an example of a winding method according to the second embodiments.

Figure 9A:
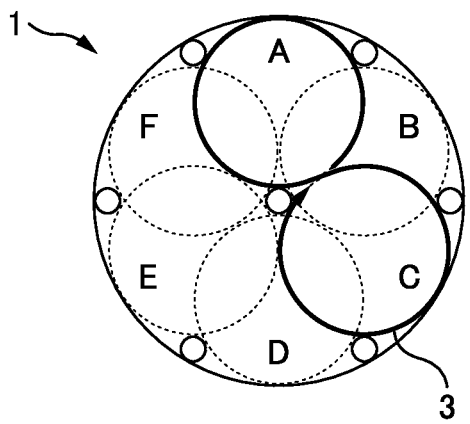
FIG. 9A to FIG. 9F are explanatory diagrams of an example of a winding method according to the second embodiments.
Figure 9B:
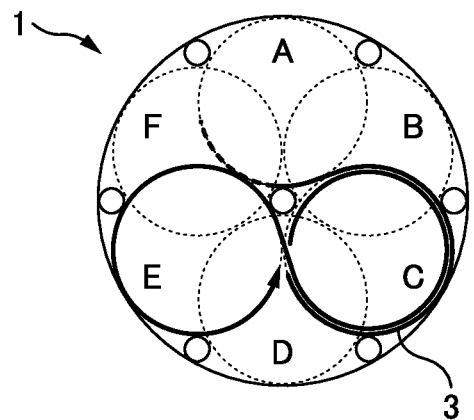

As illustrated in FIG. 9A, the linear material 3 is wound in a figure eight in the S-direction in the region pair AC. As illustrated in FIG. 9B, after the linear material 3 is wound in a figure eight in the S-direction in the region pair AC, the linear material is then wound in a figure eight in the Z-direction in the region pair CE. The method for winding the linear material 3 in the region pair AC and the region pair CE is similar to the first winding method of the first embodiments, and hence the description is omitted here (refer to FIG. 3A and FIG. 3B).

As illustrated in FIG. 9A and FIG. 9B, by winding the linear material 3 in the region pair AC and the region pair CE, the linear material is thus wound in the winding region A, the winding region C, and the winding region E. In this way, the linear material 3 is wound in every other winding region in the circumferential direction. When the winding method illustrated in FIG. 9A and FIG. 9B is simply continued as in the first winding method of the first embodiments, the linear material 3 is wound only in the winding region A, the winding region C, and the winding region E, because the number of winding regions is six (even number). In this case, the linear material 3 may not be wound in the winding region B, the winding region D, and the winding region F. As described here, in cases where the number of winding regions is an even number, if the region pair in which the linear material 3 is wound in a figure eight is simply shifted as in the above-described first embodiments, the linear material 3 will be wound in every other winding region in the circumferential direction, and the linear material 3 will not be wound in odd-numbered (or even-numbered) winding regions. To address this, in the second embodiments, the linear material 3 is wound as follows.

Figure 9C:
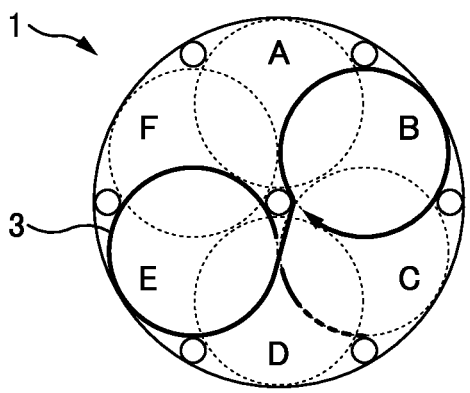

As illustrated in FIG. 9C, after the linear material 3 is wound in a figure eight in the Z-direction in the region pair CE, the linear material 3 is then wound in a figure eight in the S-direction in a region pair EB. The winding region E and the winding region B are separated from each other with two winding regions (winding region F and winding region A) being interposed therebetween in the circumferential direction. In the second embodiments, the winding region E and the winding region B, which are two winding regions separated from each other in the circumferential direction, are employed as a region pair, and the linear material 3 is wound in a figure eight in the region pair ES.

Note that the section indicated with a bold line in FIG. 9C also serves as an adjustment section when the region pair—in which the linear material 3 is wound in a figure eight—is shifted from the region pair CE to the region pair BD (to be described next; refer to FIG. 9D). In the second embodiments, as illustrated in FIG. 9C, there is an adjustment section for winding the linear material 3 between an odd-numbered winding region and an even-numbered winding region (between the winding region E and the winding region D) in the circumferential direction. In the second embodiments, as illustrated in FIG. 9C, the linear material 3 is wound in a figure eight in the adjustment section for winding the linear material 3 between an odd-numbered winding region and an even-numbered winding region (between the winding region E and the winding region D) in the circumferential direction. Hence, when the linear material 3 is pulled out from this adjustment section, twisting of the linear material 3 can be canceled out.

Figure 9D:
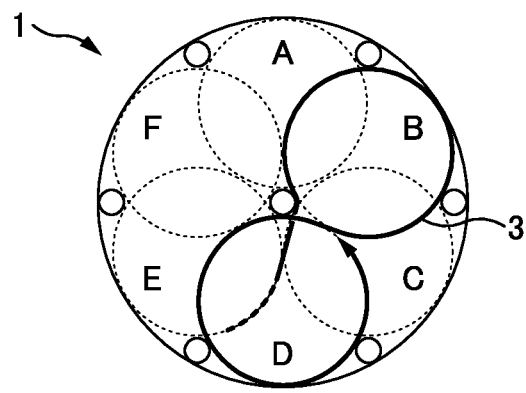

After the linear material 3 is wound in a figure eight in the S-direction in the region pair EB, the linear material 3 is subsequently wound in a figure eight in the Z-direction in the region pair BD as illustrated in FIG. 9D. Further, after the linear material 3 is wound in a figure eight in the Z-direction in the region pair BD, the linear material 3 is subsequently wound in a figure eight in the S-direction in the region pair DF as illustrated in FIG. 9E.

Figure 9E:
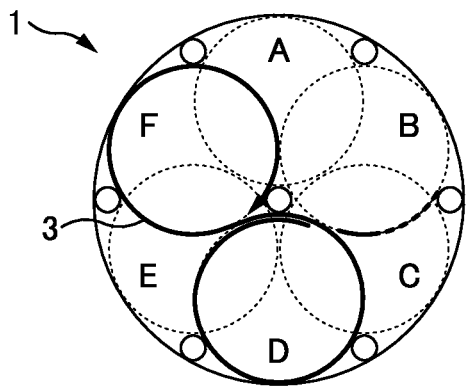

If the winding method illustrated in FIG. 9D and FIG. 9E is simply continued as in the case where the above-described winding method illustrated in FIG. 9A and FIG. 9B is simply continued, the linear material 3 will be wound only in the winding region B, the winding region D, and the winding region F, because the number of winding regions is six (even number). In this case, the linear material 3 will not be wound in the winding region A, the winding region C, and the winding region E.

Figure 9F:
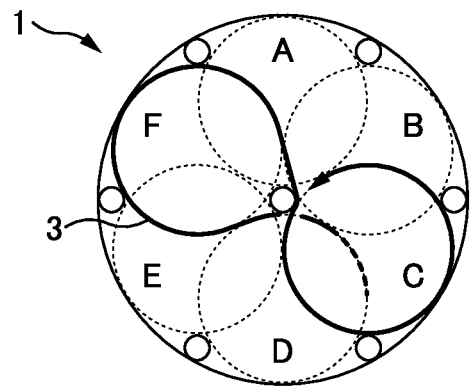

To address this, as illustrated in FIG. 9F, after the linear material 3 is wound in a figure eight in the S-direction in the region pair DF, the linear material 3 is subsequently wound in a figure eight in the Z-direction in the region pair FC. The winding region F and the winding region C are separated from each other with two winding regions (winding region A and winding region B) being interposed therebetween in the circumferential direction. In the second embodiments, the winding region F and the winding region C, which are two winding regions separated from each other in the circumferential direction, are employed as a region pair, and the linear material 3 is wound in a figure eight in the region pair FC.

Note that the section indicated with a bold line in FIG. 9F also serves as an adjustment section, like the section indicated with a bold line in FIG. 9C. In other words, the section indicated with a bold line in FIG. 9F also serves as an adjustment section when the region pair—in which the linear material 3 is wound in a figure eight—is shifted from the region pair DF to the region pair CE. Since the linear material 3 is wound in a figure eight also in this adjustment section, twisting of the linear material 3 can be canceled out when the linear material 3 is pulled out from this adjustment section.

In the above-described second embodiments, a circumferential interval between a pair of winding regions constituting a certain region pair (for example, the winding region A and the winding region C of the region pair AC) and a circumferential interval between a pair of winding regions constituting a different region pair (for example, the winding region E and the winding region B of the region pair EB) are different from each other. In this way, even when the number of winding regions is an even number, the linear material 3 can be wound in all the plurality of winding regions located in the circumferential direction. Note that, even when the number of winding regions is an odd number, a circumferential interval between a pair of winding regions constituting a certain region pair and a circumferential interval between a pair of winding regions constituting a different region pair may be different from each other.

Also in the second embodiments, the region pair in which the linear material 3 is wound in a figure eight is shifted in the clockwise direction in the circumferential direction. However, the direction in which the region pair is shifted is not limited to the clockwise direction and may be the counterclockwise direction. Also in the second embodiments, as in the first embodiments (refer to FIG. 4B), the directions in which the region pair is shifted in the circumferential direction may be changed, alternately and repeatedly, between the clockwise direction and the counterclockwise direction (i.e., the directions in which the region pair is shifted in the circumferential direction may be reversed during winding).

Also in the second embodiments, as in the second winding method of the first embodiments (refer to FIG. 5A to FIG. 5F), a common winding region may be used for the first winding region of the region pair before shifting of the region pair and the second winding region of the region pair after the shifting of the region pair. Also in the second embodiments, as in the third winding method of the first embodiments (refer to FIG. 6A to FIG. 6F), only the S-direction may be applied in all the region pairs, or only the Z-direction may be applied thereto, or both the S-direction and the Z-direction may be applied but not in an alternate manner.

{Others}

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Housing unit;
3: Linear material;
10: Housing body;
10A: Outlet;
11: Shaft member;
12: Retaining member.

The invention claimed is:

1. A housing unit comprising:
   a linear material; and
   a housing body that houses the linear material, wherein
   in the housing body, winding regions in which the linear material is wound are disposed in a circumferential direction,
   the linear material is wound in a figure eight in a first region pair constituted by a pair of the winding regions, and
   the linear material is wound in a figure eight in a second region pair constituted by a pair of the winding regions that are different from the winding regions constituting the first region pair.

2. The housing unit according to claim 1, wherein the housing body is in contact with the linear material and maintains a posture of the linear material wound in the winding regions.

3. The housing unit according to claim 1, wherein
   the housing body comprises a shaft member that is rod-shaped,
   the winding regions are disposed around an outer circumference of the shaft member, and the shaft member is in contact with the linear material wound in the winding regions.

4. The housing unit according to claim 3, wherein an inner wall surface of the housing body is in a polygonal cylindrical shape, and
the linear material wound in the winding regions is in contact with the shaft member and two portions of the inner wall surface of the housing body.

5. The housing unit according to claim 3, wherein an external shape of the housing body is in a circular cylindrical shape.

6. The housing unit according to claim 5, wherein $$r < \frac{R}{1 + \frac{1}{\sin\left(\frac{360°}{N}\right)}},$$

where
R is a radius of the housing body,
r is a bend radius of the linear material wound in the winding regions, and
N is a number of the winding regions.

7. The housing unit according to claim 3, wherein
the housing body comprises retaining members that are rod-shaped,
the retaining members are disposed in a circumferential direction along an inner wall surface of the housing body, and
the linear material wound in the winding regions is in contact with the shaft member and two of the retaining members.

8. The housing unit according to claim 1, wherein
the linear material is wound in a figure eight in an S-direction in one or more regions, and
the linear material is wound in a figure eight in a Z-direction in one or more regions.

9. The housing unit according to claim 1, wherein
the linear material is wound in a figure eight in both of the first region pair and the second region pair while shifting both of the first region pair and the second region pair in a predetermined direction in the circumferential direction, and
the linear material is wound in a figure eight in both of the first region pair and the second region pair while shifting both of the first region pair and the second region pair in a direction opposite to the predetermined direction.

10. The housing unit according to claim 1, wherein the linear material is an optical cable.

11. The housing unit according to claim 1, wherein an intersection point of the linear material wound in a figure eight in a pair of the winding regions is disposed in one of the winding regions that is not either one of the pair of the winding regions.

12. The housing unit according to claim 1, wherein an intersection point of the linear material wound in a figure eight in the first region pair is displaced in the circumferential direction from an intersection point of the linear material wound in a figure eight in the second region pair.

13. The housing unit according to claim 1, wherein the first region pair and the second region pair include a common winding region.

14. A wound body formed by winding a linear material, the wound body comprising:
circular arc parts in which the linear material is wound in a circular arc shape, wherein
the circular arc parts are disposed in a circumferential direction,
a pair of the circular arc parts constitutes a first circular arc pair in which the linear material is wound in a figure eight, and
a pair of the circular arc parts that are different from the circular arc parts constituting the first circular arc pair constitutes a second circular arc pair in which the linear material is wound in a figure eight.

\* \* \* \* \*